United States Patent [19]
Diamond

[11] 3,891,704

[45] June 24, 1975

[54] PSEUDOTHIURONIUM COMPOUNDS

[75] Inventor: Julius Diamond, Lafayette Hill, Pa.

[73] Assignee: William H. Rorer, Inc., Fort Washington, Pa.

[22] Filed: Dec. 26, 1972

[21] Appl. No.: 318,302

Related U.S. Application Data

[62] Division of Ser. No. 102,515, Dec. 29, 1970.

[52] U.S. Cl... 260/564 E; 260/293.73; 260/295.5 S; 260/343.7; 260/404; 260/453 A; 260/465 E; 260/487; 260/501.11; 260/501.14; 260/516; 260/556 A; 260/558 S; 424/263; 424/266; 424/280; 424/304; 424/309; 424/311; 424/316; 424/319; 424/321; 424/324; 424/326

[51] Int. Cl. .......................................... C07c 123/00

[58] Field of Search....... 260/564 E, 343.7, 295.5 S, 260/501.14, 501.11, 404

[56] References Cited
UNITED STATES PATENTS

| | | | |
|---|---|---|---|
| 3,513,197 | 5/1970 | Daum et al. | 260/564 E |
| 3,636,075 | 1/1972 | Loev | 260/564 E X |

OTHER PUBLICATIONS

J. Am. Chem. Soc., Vol. 69, pp. 718–723, (1947).

Chemical Abstracts, Vol. 58, Column 3340(d).

Yale, J. Med. & Pharm. Chem., Vol. 1 (No. 2), pp. 121, (1959).

*Primary Examiner*—Gerald A. Schwartz
*Attorney, Agent, or Firm*—James A. Nicholson

[57] ABSTRACT

Novel pseudothiuronium compounds and processes for their preparation are described. These compounds have gastric anti-secretory, spasmolytic and anti-ulcerogenic properties. A method for the treatment of gastrointestinal hyperacidity and ulceration is also disclosed.

2 Claims, No Drawings

PSEUDOTHIURONIUM COMPOUNDS

This is a division of application Ser. No. 102,515, filed Dec. 29, 1970.

SUMMARY OF THE INVENTION

This invention describes new pseudothiuronium compounds and processes for their preparation. This invention further provides valuable pharmaceutical preparations which contain these pseudothiuronium compounds as gastric anti-secretory, spasmolytic and anti-ulcerogenic agents. A method for the treatment of gastrointestinal hyperacidity and ulceration is also described.

BACKGROUND OF THE INVENTION

The pharmaceutical compositions which have been used as anti-secretory and spasmolytic agents have been such as atropine, homatropine, propantheline bromide, dicyclomine hydrochloride and other compounds which are structurally dissimilar to the pseudothiuronium compounds of this invention. Due to the anti-cholinergic properties of these known compounds, they produce undesirable side effects such as mydriasis, xerostomia, cyclopegia and other unwanted effects.

We have unexpectedly found that 2-arlkyl-2-pseudothiuronium compounds have valuable pharmacologic properties.

We have found that 2-aralkyl-2-pseudothiuronium salts possess useful gastric anti-secretory, spasmolytic and anti-ulcerogenic properties.

We have further found novel 2-aralkyl-2-pseudothiuronium salts.

We have also found that the compounds of this invention are substantially void of the anti-cholinergic side effects which accompany known gastric anti-secretory and spasmolytic agents.

We have still further found a simple and effective method for treating gastrointestinal hyperacidity and ulceration such as duodenal and peptic ulcers.

We have found a class of therapeutically effective compounds which can also be conveniently synthesized.

DESCRIPTION AND PREFERRED EMBODIMENTS

This invention describes a class of novel chemical compounds which contain an aralkyl or substituted aralkyl radical attached to a 2-pseudothiuronium moiety. This invention describes their non-toxic pharmaceutically acceptable salts and the method of preparing the instant compounds.

This invention also describes a new method of treating gastrointestinal disorders and diseases of the gastrointestinal tract and for use in gastrointestinal therapeutic compositions, which comprise the administration of a 2-pseudothiuronium compound having the structural formula I.

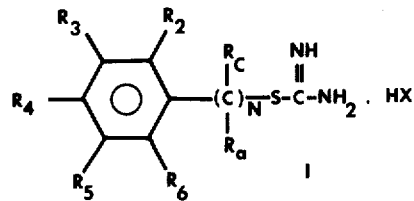

I where:

$n$ is 1–2;

$R_\alpha$ is hydrogen,
  loweralkyl,
  loweralkenyl,
  cycloloweralkyl,
  cycloloweralkenyl,
  aryl (preferably phenyl, tolyl, xylyl, etc.),
  arloweralkyl (preferably benzyl, etc.), or
  heterocyclic (preferably pyridyl, etc.);

$R_2$, $R_3$, $R_4$, $R_5$ and $R_6$ may be the same or different and are
  hydrogen,
  loweralkyl,
  halo,
  haloloweralkyl,
  nitro,
  amino,
  mono- and diloweralkylamino,
  acylamino,
  cyano,
  carbamyl,
  carboxy,
  carbloweralkoxy,
  loweralkoxy,
  haloloweralkoxy,
  hydroxy,
  acyl,
  haloacyl,
  acyloxy,
  phenoxy,
  halophenoxy,
  phenyl,
  halophenyl,
  thiocyanato,
  mercapto,
  loweralkylthio,
  loweralkylsulfinyl,
  loweralkylsulfonyl,
  haloloweralkylsulfonyl,
  sulfo,
  sulfonamido,
  sulfinamido,
  diloweralkylsulfonamido or
  halodiloweralkylsulfonamido;

HX is an organic or inorganic acid capable of forming a pharmaceutically acceptable non-toxic acid addition salt (preferably
  hydrochloric acid,
  hydrobromic acid,
  hydroiodic acid,
  sulfuric acid,
  sulfurous acid,
  nitric acid,
  nitrous acid,
  phosphoric acid,
  phosphorous acid,
  acetic acid,
  propionic acid,
  malic acid,
  maleic acid,
  succinic acid,
  citric acid,
  tartaric acid,
  ascorbic acid,
  benzoic acid,
  mandelic acid,
  lactic acid,
  nicotinic acid, benzenesulfonic acid,
methanesulfonic acid,
ethanesulfonic acid,
benzenesulfonic acid,
toluenesulfonic acid,
glycine,
alanine,
glutamic acid,
phthalic acid,
stearic acid,
oleic acid and
abietic acid); and
the free bases thereof.

The more preferred compounds which are useful in the treatment of anti-secretory, anti-spasmodic and anti-ulcerogenic diseases or disorders of the gastrointestinal tract and for use in gastrointestinal therapeutic compositions embrace those compounds of structural formula II.

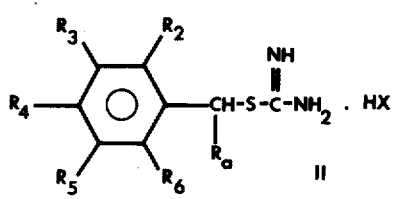

where:
R $\alpha$ is hydrogen or loweralkyl;
$R_2$, $R_3$, $R_4$, $R_5$ and $R_6$ may be the same or different and are
hydrogen,
halo,
haloloweralkyl,
nitro,
cyano,
haloloweralkoxy,
haloloweracyl,
haloloweralkylsulfonyl or
halodiloweralkylsulfonamido; and
HX is hydrochloric acid,
hydrobromic acid,
hydroiodic acid,
sulfonic acid or
acetic acid.

The most preferred compounds for the treatment of gastrointestinal disorders and for use in gastrointestinal therapeutic compositions are described by structural formula II.
where:
R $\alpha$ is hydrogen or
methyl;
$R_2$, $R_3$, $R_4$, $R_5$ and $R_6$ are
hydrogen,
fluoro,
chloro,
bromo,
iodo,
trifluoromethyl or
nitro; and
HX is hydrochloric acid or
hydrobromic acid.

In the descriptive portions of this invention, the following definitions apply: The term "lower alkyl" refers to a lower alkyl hydrocarbon group containing from 1 to about 8 carbon atoms which may be straight chained or branched.

The "lower alkenyl" group refers to a lower alkenyl hydrocarbon group containing from 2 to about 8 carbon atoms which may be straight chained or branched.

the "acyl" radical may be any organic radical derived from an organic acid by the removal of its hydroxyl group, such as acetyl, propionyl, benzoyl, etc.

The "lower alkoxy" radical signifies an alkoxy group containing from 1 to about 8 carbon atoms which can be straight chained or branched.

This invention further describes new chemical compounds which are generically described by the structural formula as shown in FIG. I:
where:
$n$ is 1–2;
R $\alpha$ is hydrogen,
loweralkyl,
loweralkenyl,
cycloloweralkyl,
cycloloweralkenyl,
aryl (preferably phenyl, tolyl, xylyl, etc.),
arloweralkyl (preferably benzyl, etc.),
heteryl (preferably pyridyl, etc.);
$R_2$, $R_3$, $R_4$, $R_5$ and $R_6$ may be the same or different and are hydrogen (provided $R_2$, $R_3$, $R_4$, $R_5$ and $R_6$ are not all hydrogen at the same time),
mono- and dialkylamino,
acylamino,
carbamyl,
carboxy,
carbloweralkoxy,
haloloweralkoxy,
acyl,
haloacyl,
acyloxy,
phenoxy,
halophenoxy,
halophenyl,
thiocyanato,
mercapto,
loweralkylthio,
loweralkylsulfinyl,
loweralkylsulfonyl,
haloloweralkylsulfonyl,
sulfo,
sulfonamido,
diloweralkylsulfonamido or
halodiloweralkylsulfonamido;
$R_2$, $R_3$, $R_4$, $R_5$ and $R_6$ may also be
fluoro,
bromo,
iodo,
nitro,
loweralkoxy,
haloloweralkyl or
cyano provided when $n$ is 1 that at least one of R $\alpha$, $R_2$, $R_3$, $R_4$, $R_5$ and $R_6$ are other than hydrogen and $R_2$ and $R_4$ are not both nitro at the same time, or
chloro provided when $n$ is 1 that fewer than three hydrogen atoms are present in the ring or R $\alpha$ is other than hydrogen when chloro is the only substituent and $R_2$, $R_4$ and $R_5$ are not all chloro at the same time; and HX is an organic or inorganic acid capable of forming a pharmaceutically acceptable non-toxic acid addition salt (preferably
hydrochloric acid,
hydrobromic acid,
hydroiodic acid,
sulfuric acid,
sulfurous acid,
nitric acid,
nitrous acid,
phosphoric acid,
phosphorous acid,
acetic acid,
propionic acid,
malic acid,
maleic acid,
succinic acid,
citric acid,
tartanic acid,
ascorbic acid,
benzoic acid,
mandelic acid,
lactic acid,
nicotinic acid,
benzenesulfonic acid,
methanesulfonic acid,
ethanesulfonic acid,
benzenesulfonic acid,
toluenesulfonic acid,
glycine,
alanine,
glutamic acid,
phthalic acid,
stearic acid,
oleic acid or
abietic acid); and
the free bases thereof.

The more preferred compounds of this invention are those described by formula II:
where:
R $\alpha$ is hydrogen,
 loweralkyl,
 aryl,
 arloweralkyl or
 heteryl;
$R_2$, $R_3$, $R_4$, $R_5$ and $R_6$ may be the same or different and are hydrogen (provided $R_2$, $R_3$, $R_4$, $R_5$ and $R_6$ are not all hydrogen at the same time),
 haloloweralkoxy,
 haloloweracyl,
 haloloweralkylsulfonyl,
 halodiloweralkylsulfonamido;
$R_2$, $R_3$, $R_4$, $R_5$ and $R_6$ may also be
 fluoro,
 bromo,
 nitro,
 cyano or
 haloloweralkyl provided at least one of R $\alpha$, $R_2$, $R_3$, $R_4$, $R_5$ and $R_6$ are other than hydrogen and $R_2$ and $R_4$ are not both nitro at the same time;
$R_2$, $R_3$, $R_4$, $R_5$ and $R_6$ may also be
 chloro provided fewer than three hydrogen atoms are present in the ring or R $\alpha$ is other than hydrogen when chloro is the only substituent and $R_2$, $R_4$ and $R_5$ are not all chloro at the same time; and
HX is hydrochloric acid,
 hydrobromic acid or
 hydroiodic acid.

The most preferred compounds of this invention are described by structural formula II:
where:
R $\alpha$ is hydrogen,
 methyl,
 benzyl or
 phenyl;
$R_2$, $R_3$, $R_4$, $R_5$ and $R_6$ are
 hydrogen (provided $R_2$, $R_3$, $R_4$, $R_5$ and $R_6$ are not all hydrogen at the same time),
 fluoro,
 bromo,
 iodo,
 trifluoromethyl or
 nitro provided at least one of R $\alpha$, $R_2$, $R_3$, $R_4$, $R_5$ and $R_6$ are other than hydrogen and $R_2$ and $R_4$ are not both nitro at the same time;
$R_2$, $R_3$, $R_4$, $R_5$ and $R_6$ may also be
 chloro provided fewer than three hydrogen atoms are present in the ring or R $\alpha$ is other than hydrogen when chloro is the only substituent and $R_2$, $R_4$ and $R_5$ are not all chloro at the same time; and
HX is hydrochloric acid or
 hydrobromic acid.

The free base of the above compounds can be prepared by any conventional method and also be within the scope of this invention.

The compounds of this invention can contain asymetric carbon atoms when $n$ is 1 or 2. For this reason, they may be obtained as racemic mixtures or as dextro (+) and levorotatory (−) isomers. These may be separated by any of the various methods of resolution to obtain the d or l compound. It is understood that these optical isomers are embraced within the scope of this invention.

Representative compounds of this invention which are particularly useful are as follows:
2-benzyl-2-pseudothiuronium chloride
2-phenethyl-2-pseudothiuronium chloride
2-benzyl-α-methyl-2-pseudothiuronium chloride
2-(o-chlorobenzyl)-2-pseudothiuronium chloride
2-(m-chlorobenzyl)-2-pseudothiuronium chloride
2-(p-chlorobenzyl)-2-pseudothiuronium chloride
2-(p-chlorophenethyl)-2-pseudothiuronium chloride
2-(p-bromobenzyl)-2-pseudothiuronium bromide
2-(p-trifluoromethylbenzyl)-2-pseudothiuronium chloride
2-(p-trifluoromethylphenethyl)-2-pseudothiuronium chloride
2-(p-trifluoromethoxybenzyl)-2-pseudothiuronium chloride
2-(p-trifluoroacetylbenzyl)-2-pseudothiuronium chloride
2-(2,3,5,6-tetrafluorophenethyl)-2-pseudothiuronium chloride
2-(3,4,5,6-pentafluorophenethyl)-2-pseudothiuronium chloride
2-(2,6-dichlorophenethyl)-2-pseudothiuronium chloride
2-(2,3-dichlorobenzyl)-2-pseudothiuronium chloride
2-(2,4-dichlorobenzyl)-2-pseudothiuronium chloride
2-(2,5-dichlorobenzyl)-2-pseudothiuronium chloride
2-(2,6-dichlorobenzyl)-2-pseudothiuronium chloride
2-(3,4-dichlorobenzyl)-2-pseudothiuronium chloride 2-(3,5-dichlorobenzyl)-2-pseudothiuronium chloride
2-(2,3,4-trichlorobenzyl)-2-pseudothiuronium chloride
2-(2,3,5-trichlorobenzyl)-2-pseudothiuronium chloride
2-(2,3,6-trichlorobenzyl)-2-pseudothiuronium chloride
2-(2,4,5-trichlorobenzyl)-2-pseudothiuronium chloride
2-(2,4,6-trichlorobenzyl)-2-pseudothiuronium chloride
2-(3,4,5-trichlorobenzyl)-2-pseudothiuronium chloride
2-(2,3,5,6-tetrachlorobenzyl)-2-pseudothiuronium chloride
2-(2,3,4,5,6-pentafluorobenzyl)-2-pseudothiuronium chloride
2-(2,6-dibromobenzyl)-2-pseudothiuronium bromide
2-(2,4,6-tribromobenzyl)-2-pseudothiuronium bromide
2-(2,6-dichloro-α-methylbenzyl)-2-pseudothiuronium chloride
2-(3,5-ditrifluoromethylbenzyl)-2-pseudothiuronium chloride
2-(3,4,5-trimethoxybenzyl)-2-pseudothiuronium chloride
2-(2,4,6-trimethoxybenzyl)-2-pseudothiuronium chloride
2-(3,5-dichloro-4-methoxybenzyl)-2-pseudothiuronium chloride
2-(2,6-dibromo-4-trifluoromethylbenzyl)-2-pseudothiuronium bromide
2-(2,4,6-tribromobenzyl)-2-pseudothiuronium bromide
2-(2,6-dibromo-4-chlorobenzyl)-2-pseudothiuronium bromide
2-(2,6-dichloro-4-bromobenzyl)-2-pseudothiuronium bromide
2-(2,6-dichloro-4-trifluoromethylbenzyl)-2-pseudothiuronium chloride
2-(2,4-dichloro-6-thiocyanatobenzyl)-2-pseudothiuronium chloride
2-(2,6-dibromo-4-fluorobenzyl)-2-pseudothiuronium chloride
2-(2,6-dichloro-4-thiocyanatobenzyl)-2-pseudothiuronium chloride
2-(2,6-dichloro-4-fluorobenzyl)-2-pseudothiuronium chloride
2-(2,6-dibromo-4-iodobenzyl)-2-pseudothiuronium iodide
2-(2,6-dichloro-4-nitrobenzyl)-2-pseudothiuronium chloride
2-(2,4-dichloro-6-nitrobenzyl)-2-pseudothiuronium chloride
2-(2,6-dibromo-4-nitrobenzyl)-2-pseudothiuronium bromide
2-(2,6-dichloro-4-cyanobenzyl)-2-pseudothiuronium chloride
2-(p-chloro-α-methylbenzyl)-2-pseudothiuronium chloride
2-(p-bromo-α-methylbenzyl)-2-pseudothiuronium bromide
2-(2,6-dichloro-α-methylbenzyl)-2-pseudothiuronium chloride
2-(2,6,4'-trichloro-4-dibenzyl)-2-pseudothiuronium chloride
2-(2,6-dichloro-4-phenoxybenzyl)-2-pseudothiuronium chloride
2-(2,6,4'-trichloro-4-phenoxybenzyl)-2-pseudothiuronium chloride
2-(2,6-dibromo-4-(4'-chlorophenoxy)benzyl)-2-pseudothiuronium bromide
2-(2,6-dibromo-4-phenoxybenzyl)-2-pseudothiuronium bromide
2-(2,6-dibromo-4'-chloro-4-dibenzyl)-2-pseudothiuronium bromide
2-(p-methoxyphenethyl)-2-pseudothiuronium chloride
2-(2,4-difluorobenzyl)-2-pseudothiuronium chloride
2-(p-trifluoromethylsulfonylbenzyl)-2-pseudothiuronium chloride
2-(3-trifluoromethyl-4-bromobenzyl)-2-pseudothiuronium bromide
2-(p-dimethylsulfamylbenzyl)-2-pseudothiuronium chloride The compounds of this invention may be prepared by the following general procedures:

Condensation of thiourea and an aralkylhalide results in the corresponding aralkyl pseudothiuronium halide. The following reaction equation illustrates this synthesis:

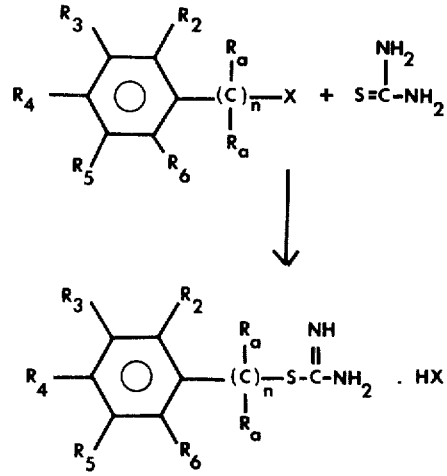

where:

HX is hydrohalic acid.

The reaction is preferably carried out on the aralkyl bromide or chloride using a solvent and with increased temperatures. The reaction is preferably carried out in an inert atmosphere preferably nitrogen or carbon dioxide. The solvent should be one that is miscible with the reactants and is convenient to use the reactant halide in excess as the solvent or alternatively a high boiling polar medium such as phenol, acetonitrile, dimethylformamide, dimethylsulfoxide, methylethylketone, isopropanol, 2-nitropropane, etc. The reaction temperature may vary from room temperature with readily reactive reactants to about 250°C, although it is preferable to run the reaction at temperatures from about 50° to 150°C. The isolation of the desired pseudothiuronium halide can be carried out by distilling off the solvent in vacuo and precipitating the pseudothiuronium halide by the addition of a hydrocarbon liquid such as n-pentane, n-hexane, cyclohexane, etc. Other anions can be produced by exchange of the halide with alkali or alkaline earth salts containing the appropriate anion. The free base may be isolated by a quantitative addition of an aqueous base such as sodium hydroxide and the desired product separated with a suitable organic solvent such as ether, chloroform, etc.

The starting materials employed in these foregoing methods are either known compounds or they may be prepared by the following reaction sequences.

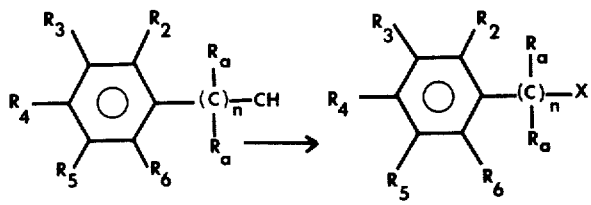

where $R_2$, $R_3$, $R_4$, $R_5$, $R_6$ and $R_a$ are as described above and $n$ is 1–2.

The reaction is normally carried out by treating a benzene solution of a benzyl or phenethyl alcohol with phosphorous trihalide, phosphorous oxyhalide, phosphorous pentahalide, thiomyhalide or sulfuryl halide at reflux temperature for about one hour. This can also be performed in other inert solvents (such as toluene, chloroform, carbon tetrachloride, etc.) or by using excess halogenating agent as solvent. A temperature from about 50° to 150°C is satisfactory. The benzyl alcohols may be prepared by the following reaction sequence.

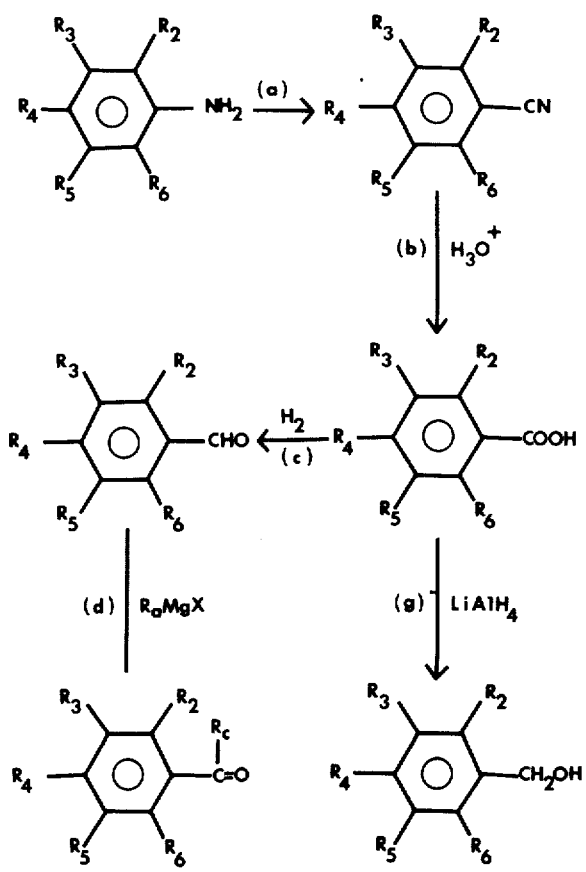

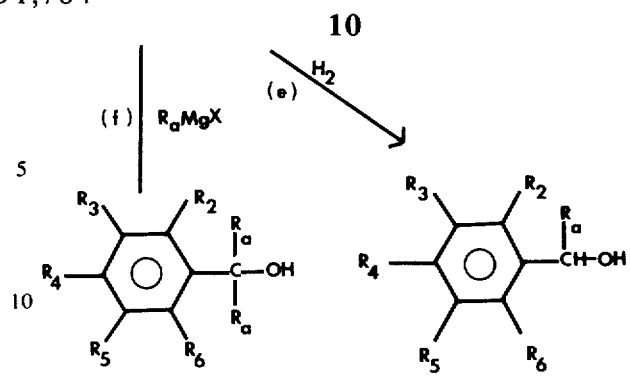

Diazotization of an aromatic amine in the conventional manner followed by a Sandmeyer (a) type displacement produces the nitrile, which is then hydrolyzed (b) to the carboxylic acid. Rosenmund reduction (c) of the carboxylic acid results in the aldehyde which in turn is interacted with the desired Grignard reagent and oxidized (d) to obtain the α-substituted ketone. This may then either be reduced catalytically (e) to the α-substituted benzyl alcohol or a second Grignard reaction (f) may be carried out to obtain the α,α-disubstituted benzyl alcohol. Lithium aluminum hydride reduction of the benzoic acid (g) results in the benzyl alcohol.

The phenethylhalide starting materials may be prepared in an analogous manner starting with the substituted α-phenylalkanoic acid.

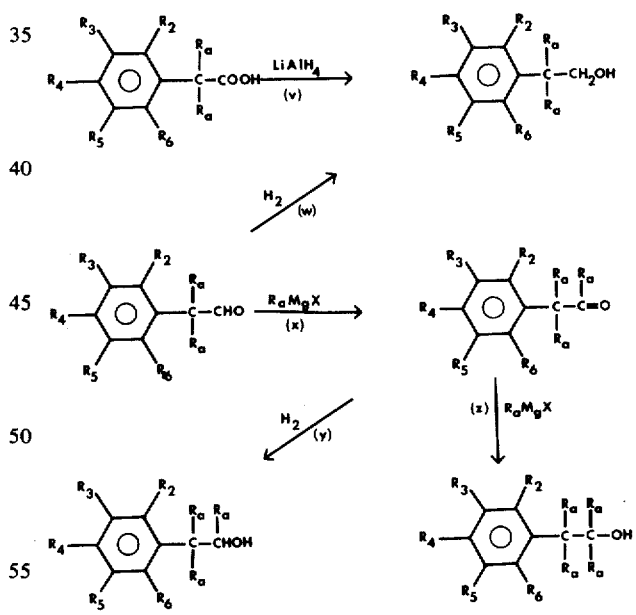

Lithium aluminumhydride reduction (v) of the proper phenylacetic acid results in the corresponding phenylethanol. This alcohol may also be prepared by catalytically reducing (w) the desired phenylacetaldehyde. A Grignard reaction (x) on the latter compound results in the α-substituted ketone which may then either be reduced catalytically (y) to the α-substituted phenethanol or a second Grignard reaction (z) may be carried out to obtain the α,α-disubstituted phenethanol.

Appropriately desired end products having various $R_2$, $R_3$, $R_4$, $R_5$ and $R_6$ substituents can be prepared at various stages of the synthesis of the starting materials by using suitable reactions in order to convert one group to another. Thus, for example, using conventional methods, a halogen group can be treated under Rosenmund Von Brown conditions to the nitrile compound which in turn can be hydrolyzed to a carboxy. A nitro can be reduced to an amino which can be alkylated to the dialkylamino substituent. A hydroxy compound can be prepared by demethylation of a methoxy substituent. A Sandmeyer type reaction can be carried out on an amino compound to introduce a chloro, bromo, xanthate, hydroxyl or alkoxyl group. The xanthate can then lead to the mercapto by hydrolysis, this in turn can be alkylated to an alkylthio group which can be oxidized to alkylsulfinyl and alkylsulfonyl groups. A thiocyanato group may be reduced to a mercapto. An iodo group may be removed by catalytic hydrogenation.

We have found that the compounds of this invention have useful anti-ulcerogenic properties. Further, they have an effective degree of gastric anti-secretory activity, i.e., they reduce the volume and the acidity of the gastric fluid in humans and mammals. Still further, these compounds produce a considerable spasmolytic action on the gastrointestinal musculature, i.e., they reduce the peristaltic action of the gastrointestinal musculature which is manifested by a delay in gastric emptying time.

Until now, the known anti-ulcerogenic compounds which show gastric anti-secretory and gastrointestinal spasmolytic action have included such agents as atropine, homatropine, propantheline, dicyclomine, etc. These compounds, however, cause accompanying undesirable anti-cholinergic properties such as mydriasis, xerostomia, cyclopegia, etc.

We have found that the pseudothiuronium compounds of this invention are particularly useful as anti-secretory, anti-spasmodic and anti-ulcerogenic agents because they are essentially devoid of these unwanted effects.

In particular, the pseudothiuronium compounds, as herein described, are useful in the treatment of such gastrointestinal disorders and diseases as duodenal and peptic ulcers.

For all these purposes, the pseudothiuronium compounds of this invention can be administered orally or parenterally, but they are preferably administered orally. Orally, they may be administered as tablets, aqueous or oily suspension, dispersible powders or granules, emulsions, hard and soft capsules, or syrups or elixirs. The term parenteral, as used herein, includes subcutaneous injection, intramuscular injection or infusion techniques.

Compositions intended for oral use may be prepared according to any method known to the art for the manufacture of pharmaceutical compositions and such compositions may contain one or more agents selected from the group consisting of sweetening agents, flavoring agents, coloring agents and preserving agents, in order to provide a pharmaceutically elegant and palatable preparation.

Further, these compounds may be tableted or otherwise formulated so that for every 100 parts by weight of the composition, there are present between 5 and 95 parts by weight of the active ingredient. The dosage unit form will generally contain between about 1 mg. and about 500 mg. of the active ingredients of this invention. The preferred unit dose is between about 10 mg. and 100 mg.

The dosage regimen in carrying out the methods of this invention is that which insures maximum therapeutic response until improvement is obtained and thereafter the minimum effective level which gives relief. Thus, in general, the dosages are those that are therapeutically effective in the treatment of ulcerogenic disease conditions or symptoms, such as duodenal and peptic ulcers. In general, the daily dose can be between about 0.1 mg/kg and 50 mg/kg (preferably in the range of 1–25 mg/kg/day). Bearing in mind, of course, that in selecting the appropriate dosage in any specific case, consideration must be given to the patient's weight, general health, age and other factors which may influence response to the drug.

Various tests in animals have been carried out to show the ability of the compounds of this invention to exhibit reactions that can be correlated with anti-ulcerogenic activity in humans. These tests involve such as the effect of the pseudothiuronium compounds on gastric secretion, gastrointestinal spasm and their effect against ulcerogenic agents. It has been found that the compounds of this invention when tested in the above variety of situations show a marked activity.

One such test is the gastric secretion test. This test is carried out as follows: Shay rats are fasted for 4–8 hours, and water is given ad lib. The rats are selected at random and separated into groups of 10. The animals are treated intraduodenally (I.D.) with the test compound or the vehicle immediately subsequent to the ligation of the stomach at the pyloric sphincter. The animals are sacrificed with chloroform at 4 hours postdrug administration, the stomach is removed and its contents are assayed for volume, pH and total acids.

A second gastric secretion test is carried out on dogs. This is outlined in the Handbook of Physiology, Section 6: Alimentary Canal, Volume II: Secretion, American Physiology Society, Washington, D.C., 1967.

It has been found that the compounds of this invention when subjected to the above gastric secretion tests display a marked ability to decrease gastric volume and gastric acidity. These tests are known to correlate well with gastric activity in humans and is a standard test used to determine anti-secretory properties.

To determine the anti-ulcer effectiveness, the following test is employed: Male Wistar rats (130–150 grams) are fasted for 24 hours, then given reserpine at 5 mg/kg i.p. Twenty-four hours later, the stomachs are removed and examined for ulceration. Ulcers are graded on a 0–4 scale and the number of ulcers is recorded. Pretreatment with the pseudothiuronium compounds of this invention produces a decrease in ulcer grade and the number of ulcers compared to the control reserpine-treated rats.

Determination of anti-spasmodic properties can be carried out by the procedure as outlined by D. A. Brodie and S. K. Kundrats in their article entitled "Effect of Drugs on Gastric Emptying in Rats", Fed. Proc. 24:714 (1965).

Mydriasis is detected by the procedure R. A. Turner, Screening Methods in Pharmacology, Academic Press, New York and London, pp. 174–5, 1965. Acute toxicity is calculated according to the standard Litchfield-Wilcoxon procedure.

In view of the results of these tests, the pharmacological data clearly indicates that the 2-aralkyl-2-pseudothiuronium compounds of this invention can be considered to be effective anti-ulcerogenic, gastric anti-secretory, and anti-spasmodic agents which are substantially free of anti-cholinergic side effects and having a low toxicity.

The following are detailed examples which show the preparation of the compounds of this invention. They are to be construed as illustrations of said compounds and not as limitations thereof.

EXAMPLE 1

2,6-Dichloro-α-methylbenzyl alcohol

To a solution of 3 g. of sodium borohydride (0.067 mole) dissolved in 110 ml methanol and 30 ml of 10% aqueous sodium hydroxide is added dropwise 23 g. of 2,6-dichloroacetophenone (0.122 mole) in 70 ml of methanol at ice-water temperature and with stirring. After addition is completed, the mixture is stirred at room temperature for 15 hours. The mixture is then acidified with 10% aqueous hydrochloric acid at ice water temperature and the methanol is removed in vacuo. Two layers are formed and the upper aqueous layer is extracted with 2–100 ml portions of ether, the ether is combined with the organic layer and the combined mixture is washed with 2–50 ml portions of water, dried over magnesium sulfate and the ether removed to give 2,6-dichloro-α-methylbenzyl alcohol.

When the 2,6-dichloroacetophenone of the above example is replaced with the compounds of Table I below then the corresponding alcohols of Table II below are prepared.

Table I p-trifluoromethylbenzaldehyde
2,6-dichlorobenzaldehyde
benzaldehyde p-trifluoroacetylbenzaldehyde
o-trifluoromethylbenzaldehyde
p-trifluoromethylsulfonylbenzaldehyde
3,5-dimethylbenzaldehyde o-chlorobenzaldehyde
m-chlorobenzaldehyde
p-chlorobenzaldehyde
p-ditrifluoromethylsulfamylbenzaldehyde
p-dimethylsulfamylbenzaldehyde
p'-bromobenzaldehyde
2,4-dichlorobenzaldehyde
2,3-dichlorobenzaldehyde 3,4-dichlorobenzaldehyde
3,5-dichlorobenzaldehyde
2,5-dichlorobenzaldehyde
m-nitrobenzaldehyde
p-nitrobenzaldehyde p-dimethylaminobenzaldehyde
o-methylbenzaldehyde
m-methylbenzaldehyde
p-methylbenzaldehyde
p-cyanobenzaldehyde
p-methoxybenzaldehyde
p-carbethoxybenzaldehyde
o-methoxybenzaldehyde
p-acetoxybenzaldehyde
p-phenoxybenzaldehyde
p-(4-chlorophenoxy)benzaldehyde
p-methylthiobenzaldehyde
p-dimethylsulfonamidobenzaldehyde
cyclopropylmethyl phenyl ketone
ethyl phenyl ketone
allyl phenyl ketone
benzophenone
benzyl ketone
2,6-dibromobenzaldehyde
2,6-difluorobenzaldehyde
3,4,5-trimethoxybenzaldehyde
2,4,6-trimethoxybenzaldehyde
3,5-dichlorobenzaldehyde
2,4,6-trichlorobenzaldehyde
2,3,4-trichlorobenzaldehyde
3,4,5-trichlorobenzaldehyde
2,4,5-trichlorobenzaldehyde
2,3,5-trichlorobenzaldehyde
2,3,6-trichlorobenzaldehyde
2,4-dibromobenzaldehyde
2,4-difluorobenzaldehyde
2-bromo-4-nitrobenzaldehyde
2,4,6-tribromobenzaldehyde
3,5-dibromobenzaldehyde
2,3,4-trimethylbenzaldehyde
3,5-difluorobenzaldehyde
p-(4-chlorophenyl)benzaldehyde
2,6-dichloro-4-trifluoromethyl
2,5-dinitrobenzaldehyde
2,6-dichloro-4-cyanobenzaldehyde
2,6-dichloro-4-thiocyanatobenzaldehyde
2,6-dichloro-4-fluorobenzaldehyde
p-acetamidobenzaldehyde
2-methoxy-4-chlorobenzaldehyde
2,3,4,5,6-pentafluorobenzaldehyde
2,3,5,6-tetrafluorobenzaldehyde
p-phenylbenzaldehyde
2,4-dichloro-6-thiocyanatobenzaldehyde
2,4-dichloro-6-nitrobenzaldehyde
2-nitro-4-trifluoromethylbenzaldehyde
2,6-dichloro-4-bromobenzaldehyde
3,5-ditrifluoromethylbenzaldehyde
3,5-dichloro-4-methoxybenzaldehyde
2-chloro-4-trifluoromethylbenzaldehyde
2,6-dibromo-4-chlorobenzaldehyde
2-chloro-4-bromobenzaldehyde
2,6-dibromo-4-nitrobenzaldehyde
2,6-dichloro-4-nitrobenzaldehyde
2,6-dibromo-4-iodobenzaldehyde
2,6-dibromo-4-trifluoromethylbenzaldehyde
2,6-dibromo-4-fluorobenzaldehyde
2,4,6-trichlorophenyl methyl ketone 2,6-dichlorophenyl methyl ketone
2,6-dichlorophenyl phenyl ketone
2,6-dichlorophenyl cyclohexyl ketone
2-pyridyl phenyl ketone
4-pyridyl phenyl ketone
phenylacetaldehyde
cyclohex-2-enyl phenyl ketone
o-tolyl phenyl ketone
2,4-xylyl phenyl ketone
benzyl phenyl ketone
2,6-dichlorophenylacetaldehyde
p-chlorobenzyl methyl ketone
αmethylbenzyl phenyl ketone
diphenylacetaldehyde
2,6,4′-trichloro-4-phenylbenzaldehyde
2,6-dichloro-4-phenoxybenzaldehyde
2,6,4′-trichloro-4-phenoxybenzaldehyde
2,6-dibromo-4-(4′-chlorophenoxy)benzaldehyde
2,6-dibromo-4-phenoxybenzaldehyde
2,6-dibromo-4′-chloro-4-phenylbenzaldehyde Table II p-trifluoromethylbenzyl alcohol
2,6-dichlorobenzyl alcohol
benzyl alcohol
p-trifluoromethoxybenzyl alcohol
p-trifluoroacetylbenzyl alcohol
o-trifluoromethylbenzyl alcohol
p-trifluoromethylsulfonylbenzyl alcohol
3,5-dimethylbenzyl alcohol
o-chlorobenzyl alcohol
m-chlorobenzyl alcohol
p-chlorobenzyl alcohol
p-ditrifluoromethylsulfamylbenzyl alcohol
p-dimethylsulfamylbenzyl alcohol
p-bromobenzyl alcohol
2,4-dichlorobenzyl alcohol
2,3-dichlorobenzyl alcohol
3,4-dichlorobenzyl alcohol
3,5-dichlorobenzyl alcohol
2,5-dichlorobenzyl alcohol
m-nitrobenzyl alcohol
p-nitrobenzyl alcohol
p-dimethylaminobenzyl alcohol
o-methylbenzyl alcohol
m-methylbenzyl alcohol
p-methylbenzyl alcohol
p-cyanobenzyl alcohol
p-methoxybenzyl alcohol
p-carbethoxybenzyl alcohol
o-methoxybenzyl alcohol
p-acetoxybenzyl alcohol
p-phenoxybenzyl alcohol
p-(4-chlorophenoxy)benzyl alcohol
p-methylthiobenzyl alcohol
p-dimethylsulfonamidobenzyl alcohol
α-cyclopropylmethylbenzyl alcohol
α-ethylbenzyl alcohol
α-allylbenzyl alcohol
benzhydryl alcohol
α-benzylphenethyl alcohol
2,6-dibromobenzyl alcohol
2,6-difluorobenzyl alcohol
3,4,5-trimethoxybenzyl alcohol
2,4,6-trimethoxybenzyl alcohol
3,5-dichlorobenzyl alcohol
2,4,6-trichlorobenzyl alcohol
2,3,4-trichlorobenzyl alcohol
3,4,5-trichlorobenzyl alcohol
2,4,5-trichlorobenzyl alcohol
2,3,5-trichlorobenzyl alcohol
2,3,6-trichlorobenzyl alcohol
2,4-dibromobenzyl alcohol
2,4-difluorobenzyl alcohol
2-bromo-4-nitrobenzyl alcohol
2,3,4-trimethylbenzyl alcohol
2,4,6-tribromobenzyl alcohol
3,5-dibromobenzyl alcohol
3,5-difluorobenzyl alcohol
p-(4-chlorophenyl)benzyl alcohol
2,6-dichloro-4-trifluoromethylbenzyl alcohol
2,5-dinitrobenzyl alcohol
2,6-dichloro-4-cyanobenzyl alcohol
2,6-dichloro-4-thiocyanatobenzyl alcohol
2,6-dichloro-4-fluorobenzyl alcohol
p-acetamidobenzyl alcohol
2-methoxy-4-chlorobenzyl alcohol
2,3,4,5,6-pentafluorobenzyl alcohol
2,3,5,6-tetrafluorobenzyl alcohol
p-phenylbenzyl alcohol
2,4-dichloro-6-thiocyanatobenzyl alcohol
2,4-dichloro-6-nitrobenzyl alcohol
2-nitro-4-trifluoromethylbenzyl alcohol
2,6-dichloro-4-bromobenzyl alcohol
3,5-ditrifluoromethylbenzyl alcohol
3,5-dichloro-4-methoxybenzyl alcohol
2-chloro-4-trifluoromethylbenzyl alcohol
2,6-dibromo-4-chlorobenzyl alcohol
2-chloro-4-bromobenzyl bromide
2,6-dibromo-4-nitrobenzyl alcohol
2,6-dichloro-4-nitrobenzyl alcohol
2,6-dibromo-4-iodobenzyl alcohol
2,6-dibromo-4-trifluoromethylbenzyl alcohol
2,6-dibromo-4-fluorobenzyl alcohol
2,6-dichloro-α-methylbenzyl alcohol
2,4,6-trichloro-α-methylbenzyl alcohol
2,6-dichloro-α,α-dimethylbenzyl alcohol
2,6-dichloro-α-phenylbenzyl alcohol
2,6-dichloro-α-cyclohexylbenzyl alcohol
α-(2′-pyridyl)benzyl alcohol
α-(4′-pyridyl)benzyl alcohol
phenethyl alcohol
p-chlorophenethyl alcohol
α-(cyclohex-2-enyl)benzyl alcohol
α-(o-tolyl)benzyl alcohol
α-(2,4-xylyl)benzyl alcohol
α-benzylbenzyl alcohol
2,6-dichlorophenethyl alcohol
p-chloro-α-methylphenethyl alcohol
α,β-di-methylphenethyl alcohol
β-phenylphenethyl alcohol
2,6,4′-trichloro-4-phenylbenzyl alcohol
2,6-dichloro-4-phenoxybenzyl alcohol
2,6,4′-trichloro-4-phenoxybenzyl alcohol
2,6-dibromo-4-(4′-chlorophenoxy)benzyl alcohol
2,6-dibromo-4-phenoxybenzyl alcohol
2,6-dibromo-4′-chloro-4-phenylbenzyl alcohol

EXAMPLE 2

2,6-Dichloro-α-methylbenzyl chloride

To a refluxing solution of 60 ml (0.83 mole) of thionyl chloride is added 23.5 g. (0.11 mole) of 2,6-dichloro-α-methylbenzyl alcohol. The mixture is refluxed for 3 hours, cooled to room temperature and the excess thionyl chloride is removed. The residue is then added to 50 ml of ice water, the organic phase is extracted with ether, worked with sodium bicarbonate solution and water. The ether is then dried over magnesium sulfate and evaporated to dryness to obtain 2,6-dichloro-α-methylbenzyl chloride.

When the above reaction is followed using the appropriate thionyl halide, sulfuryl halide, phosphorous oxyhalide, phosphorous pentahalide or phosphorous trihalide in place of thionyl chloride and the alcohols of Table II, Example 1, then the corresponding halide of Table I below is prepared.

Table I p-trifluoromethylbenzyl chloride
2,6-dichlorobenzyl chloride
benzyl bromide
benzyl chloride
benzyl iodide
p-trifluoromethoxybenzyl chloride
p-trifluoroacetylbenzyl chloride
o-trifluoromethylbenzyl chloride
p-trifluoromethylsulfonylbenzyl chloride
3,5-dimethylbenzyl bromide
o-chlorobenzyl chloride
m-chlorobenzyl chloride
p-chlorobenzyl chloride
p-ditrifluoromethylsulfamylbenzyl chloride
p-dimethylsulfamylbenzyl chloride
p-bromobenzyl bromide
2,4-dichlorobenzyl chloride
2,3-dichlorobenzyl chloride
3,4-dichlorobenzyl chloride
3,5-dichlorobenzyl chloride
2,5-dichlorobenzyl chloride
m-nitrobenzyl chloride
p-nitrobenzyl chloride
p-dimethylaminobenzyl chloride
o-methylbenzyl chloride
m-methylbenzyl chloride
p-methylbenzyl chloride
p-cyanobenzyl chloride
p-methoxybenzyl chloride
p-carbethoxybenzyl chloride
o-methoxybenzyl chloride
p-acetoxybenzyl chloride
p-phenoxybenzyl chloride
p-(4-chlorophenoxy)benzyl chloride
p-methylthiobenzyl chloride
p-dimethylsulfonamidobenzyl chloride
α-cyclopropylmethylbenzyl chloride
α-ethylbenzyl chloride
α-allylbenzyl chloride
benzhydryl chloride
α-benzylphenethyl chloride
2,6-dibromobenzyl bromide
2,6-difluorobenzyl bromide
3,4,5-trimethoxybenzyl chloride
2,4,6-trimethoxybenzyl chloride
3,5-dichlorobenzyl chloride
2,4,6-trichlorobenzyl chloride
2,3,4-trichlorobenzyl chloride
3,4,5-trichlorobenzyl chloride
2,4,5-trichlorobenzyl chloride
2,3,5-trichlorobenzyl chloride
2,3,6-trichlorobenzyl chloride
2,4-dibromobenzyl bromide
2,4-difluorobenzyl bromide
2,4-dibromobenzyl bromide
2-bromo-4-nitrobenzyl bromide
2,3,4-trimethylbenzyl chloride
2,4,6-tribromobenzyl bromide
3,5-dibromobenzyl bromide
3,5-difluorobenzyl bromide
p-(4-chlorophenyl)benzyl chloride
2,6-dichloro-4-trifluoromethylbenzyl chloride
2,5-dinitrobenzyl chloride
2,6-dichloro-4-cyanobenzyl chloride
2,6-dichloro-4-thiocyanatobenzyl chloride
2,6-dichloro-4-fluorobenzyl chloride
p-acetamidobenzyl chloride
2-methoxy-4-chlorobenzyl chloride
2,3,4,5,6-pentafluorobenzyl chloride
2,3,5,6-tetrafluorobenzyl chloride
p-phenylbenzyl chloride
2,4-dichloro-6-thiocyanatobenzyl chloride
2,4-dichloro-6-nitrobenzyl chloride
2-nitro-4-trifluoromethylbenzyl chloride
2,6-dichloro-4-bromobenzyl bromide
3,5-ditrifluoromethylbenzyl chloride
3,5-dichloro-4-methoxybenzyl chloride
2-chloro-4-trifluoromethylbenzyl chloride
2,6-dibromo-4-chlorobenzyl bromide
2-chloro-4-bromobenzyl bromide
2,6-dibromo-4-nitrobenzyl bromide
2,6-dichloro-4-nitrobenzyl chloride
2,6-dibromo-4-iodobenzyl iodine
2,6-dibromo-4-trifluoromethylbenzyl bromide
2,6-dibromo-4-fluorobenzyl bromide
2,6-dichlorop-α-methylbenzyl chloride
2,4,6-trichloro-α-methylbenzyl chloride
2,6-dichloro-α,α-dimethylbenzyl chloride
2,6-dichloro-α-phenylbenzyl chloride
2,6-dichloro-α-cyclohexylbenzyl chloride
α-(2'-pyridyl)benzyl chloride
phenethyl chloride
p-chlorophenethyl chloride
α-(cyclohex-2-enyl)benzyl chloride
α-(o-tolyl)benzyl chloride
α-(2,4-xylyl)benzyl chloride
α-benzylbenzyl chloride
2,6-dichlorophenethyl chloride
p-chloro-α-methylphenethyl chloride
α,α-di-methylphenethyl chloride
α-phenylphenethyl chloride
2,6,4'-trichloro-4-phenylbenzyl chloride
2,6-dichloro-4-phenoxybenzyl chloride
2,6,4'-trichloro-4-phenoxybenzyl chloride
2,6-dibromo-4-(4'-chlorophenoxy)benzyl bromide
2,6-dibromo-4-phenoxybenzyl bromide
2,6-dibromo-4-chloro-4-phenylbenzyl bromide

EXAMPLE 3

2-(2,6-Dichloro-α-methylbenzyl)-2-pseudothiuronium chloride

A mixture of 9.1 g. (0.0435 mole) of 2,6-dichloro-α-methylbenzyl chloride and 33.3 g. (0.0435 mole) of thiourea in 150 ml of absolute ethanol is refluxed for 48 hours. The ethanol is then removed in vacuo and the residue is triturated with ether and filtered. Reprecipitation from acetone-ether affords 2-(2,6-dichloro-α-methylbenzyl)-2-pseudothiuronium chloride.

When 2,6-dichloro-α-methylbenzyl chloride in the above example is replaced by the benzyl halides of Table I, Example 2, then the corresponding product of Table I below is obtained.

Table I 2-(p-trifluoromethylbenzyl)-2-pseudothiuronium chloride
2-(2,6-dichlorobenzyl)-2-pseudothiuronium chloride
2-benzyl-2-pseudothiuronium bromide
2-benzyl-2-pseudothiuronium chloride
2-benzyl-2-pseudothiuronium iodide
2-(p-trifluoromethoxybenzyl)-2-pseudothiuronium chloride
2-(p-trifluoroacetylbenzyl)-2-pseudothiuronium chloride
2-(o-trifluoromethylbenzyl)-2-pseudothiuronium chloride
2-(p-trifluoromethylsulfonylbenzyl)-2-pseudothiuronium chloride
2-(3,5-dimethylbenzyl)-2-pseudothiuronium chloride
2-(o-chlorobenzyl)-2-pseudothiuronium chloride
2-(m-chlorobenzyl)-2-pseudothiuronium chloride
2-(p-chlorobenzyl)-2-pseudothiuronium chloride
2-(p-ditrifluoromethylsulfamylbenzyl)-2-pseudothiuronium chloride
2-(p-dimethylsulfamylbenzyl)-2-pseudothiuronium chloride
2-(p-bromobenzyl)-2-pseudothiuronium bromide
2-(2,4-dichlorobenzyl)-2-pseudothiuronium chloride
2-(2,3-dichlorobenzyl)-2-pseudothiuronium chloride
2-(3,4-dichlorobenzyl)-2-pseudothiuronium chloride
2-(3,5-dichlorobenzyl)-2-pseudothiuronium chloride
2-(2,5-dichlorobenzyl)-2-pseudothiuronium chloride
2-(m-nitrobenzyl)-2-pseudothiuronium chloride
2-(p-nitrobenzyl)-2-pseudothiuronium chloride
2-(p-dimethylaminobenzyl)-2-pseudothiuronium chloride
2-(o-methylbenzyl)-2-pseudothiuronium chloride
2-(m-methylbenzyl)-2-pseudothiuronium chloride
2-(p-methylbenzyl)-2-pseudothiuronium chloride
2-(p-cyanobenzyl)-2-pseudothiuronium chloride
2-(p-methoxybenzyl)-2-pseudothiuronium chloride
2-(p-carbethoxybenzyl)-2-pseudothiuronium chloride
2-(o-methoxybenzyl)-2-pseudothiuronium chloride
2-(p-acetoxybenzyl)-2-pseudothiuronium chloride
2-(p-phenoxybenzyl)-2-pseudothiuronium chloride
2-[p-(4-chlorophenoxy)benzyl]-2-pseudothiuronium chloride
2-(p-methylthiobenzyl)-2-pseudothiuronium chloride
2-(p-dimethylsulfonamidobenzyl)-2-pseudothiuronium chloride
2-(α-cyclopropylmethylbenzyl)-2-pseudothiuronium chloride
2-(α-ethylbenzyl)-2-pseudothiuronium chloride
2-(α-allylbenzyl)-2-pseudothiuronium chloride
2-(benzhydryl)-2-pseudothiuronium chloride
2-(α-benzylphenethyl-2-pseudothiuronium chloride
2-(2,6-dibromobenzyl)-2-pseudothiuronium bromide
2-(2,6-difluorobenzyl)-2-pseudothiuronium chloride
2-(3,4,5-trimethoxybenzyl)-2-pseudothiuronium chloride
2-(2,4,6-trimethoxybenzyl)-2-pseudothiuronium chloride
2-(3,5-dichlorobenzyl)-2-pseudothiuronium chloride
2-(2,4,6-trichlorobenzyl)-2-pseudothiuronium chloride
2-(2,3,4-trichlorobenzyl)-2-pseudothiuronium chloride
2-(3,4,5-trichlorobenzyl)-2-pseudothiuronium chloride
2-(2,4,5-trichlorobenzyl)-2-pseudothiuronium chloride
2-(2,3,5-trichlorobenzyl)-2-pseudothiuronium chloride
2-(2,3,6-trichlorobenzyl)-2-pseudothiuronium chloride
2-(2,4-dibromobenzyl)-2-pseudothiuronium bromide
2-(2,4-difluorobenzyl)-2-pseudothiuronium chloride
2-(2,4-dibromobenzyl)-2-pseudothiuronium bromide
2-(2-bromo-4-nitrobenzyl)-2-pseudothiuronium bromide
2-(2,3,4-trimethylbenzyl)-2-pseudothiuronium chloride
2-(2,4,6-tribromobenzyl)-2-pseudothiuronium bromide
2-(3,5-dibromobenzyl)-2-pseudothiuronium bromide
2-(3,5-difluorobenzyl)-2-pseudothiuronium chloride
2-[p-(4-chlorophenyl)benzyl]-2-pseudothiuronium chloride
2-(2,6-dichloro-4-trifluoromethylbenzyl)-2-pseudothiuronium chloride
2-(2,5-dinitrobenzyl)-2-pseudothiuronium chloride
2-(2,6-dichloro-4-cyanobenzyl)-2-pseudothiuronium chloride
2-(2,6-dichloro-4-thiocyanatobenzyl)-2-pseudothiuronium chloride
2-(2,6-dichloro-4-fluorobenzyl)-2-pseudothiuronium chloride
2-(p-acetamidobenzyl)-2-pseudothiuronium chloride
2-(2-methoxy-4-chlorobenzyl)-2-pseudothiuronium chloride
2-(2,3,4,5,6-pentafluorobenzyl)-2-pseudothiuronium chloride
2-(2,3,5,6-tetrafluorobenzyl)-2-pseudothiuronium chloride
2-(p-phenylbenzyl)-2-pseudothiuronium chloride
2-(2,4-dichloro-6-thiocyanatobenzyl)-2-pseudothiuronium chloride
2-(2,4-dichloro-6-nitrobenzyl)-2-pseudothiuronium chloride
2-(2-nitro-4-trifluoromethylbenzyl)-2-pseudothiuronium chloride
2-(2,6-dichloro-4-bromobenzyl)-2-pseudothiuronium chloride
2-(3,5-ditrifluoromethylbenzyl)-2-pseudothiuronium chloride
2-(3,5-dichloro-4-methoxybenzyl)-2-pseudothiuronium chloride
2-(2-chloro-4-trifluoromethylbenzyl)-2-pseudothiuronium chloride
2-(2,6-dibromo-4-chlorobenzyl)-2-pseudothiuronium bromide
2-(2-chloro-4-bromobenzyl)-2-pseudothiuronium bromide
2-(2,6-dibromo-4-nitrobenzyl)-2-pseudothiuronium bromide
2-(2,6-dichloro-4-nitrobenzyl)-2-pseudothiuronium chloride 2-(2,6-dibromo-4-iodobenzyl)-2-pseudothiuronium bromide
2-(2,6-dibromo-4-trifluoromethylbenzyl)-2-pseudothiuronium chloride
2-(2,6-dibromo-4-fluorobenzyl)-2-pseudothiuronium chloride
2-(2,6-dichloro-α-methylbenzyl)-2-pseudothiuronium chloride
2-(2,4,6-trichloro-α-methylbenzyl)-2-pseudothiuronium chloride
2-(2,6-dichloro-α,α-dimethylbenzyl)-2-pseudothiuronium chloride
2-(2,6-dichloro-α-phenylbenzyl)-2-pseudothiuronium chloride
2-(2,6-dichloro-α-cyclohexylbenzyl)-2-pseudothiuronium chloride
2-(α-(2'-pyridyl)benzyl)-2-pseudothiuronium chloride
2-(α-(4'-pyridyl)benzyl)-2-pseudothiuronium chloride
2-(phenethyl)-2-pseudothiuronium chloride
2-(p-chlorophenethyl)-2-pseudothiuronium chloride
2-[α-(cyclohex-2-enyl)benzyl]-2-pseudothiuronium chloride
2-(α-tolylbenzyl)-2-pseudothiuronium chloride
2-(α-xylylbenzyl)-2-pseudothiuronium chloride
2-(2-benzylbenzyl)-2-pseudothiuronium chloride
2-(2,6-dichlorophenethyl)-2-pseudothiuronium chloride
2-(p-chloro-α-methylphenethyl)-2-pseudothiuronium chloride
2-(α,β-di-methylphenethyl)-2-pseudothiuronium chloride
2-(β-phenylphenethyl)-2-pseudothiuronium chloride
2-(2,6,4'-trichloro-4-phenylbenzyl)-2-pseudothiuronium chloride
2-(2,6-dichloro-4-phenoxybenzyl)-2-pseudothiuronium chloride
2-(2,6,4'-trichloro-4-phenoxybenzyl)-2-pseudothiuronium chloride
2-[2,6-dibromo-4-(4'-chlorophenoxy)benzyl]-2-pseudothiuronium bromide
2-(2,6-dibromo-4-phenoxybenzyl)-2-pseudothiuronium bromide
2-(2,6-dibromo-4'-chloro-4-phenylbenzyl)-2-pseudothiuronium bromide

EXAMPLE 4

2-(2,6-Dichloro-α-methylbenzyl)-2-pseudothiuronium bromide

Twenty-five g. of 2-(2,6-dichloro-α-methylbenzyl)-2-pseudothiuronium chloride is added to 200 ml of a saturated aqueous sodium bromide solution. The mixture is warmed to 50°C and digested for 5 min., cooled in an ice-bath and the water decanted. Another 200 ml of saturated sodium bromide solution is added and the procedure repeated. The ion exchanged thiuronium is filtered and washed with 3–50 ml portions of ice cold water. The solid is then dried to obtain 2-(2,6-dichloro-α-methylbenzyl)-2-pseudothiuronium bromide.

When the sodium bromide solution in the above example is replaced with a solution of sodium iodide then the resultant compound is 2-(2,6-dichloro-α-methylbenzyl)-2-pseudothiuronium iodide.

In a similar manner the chloride ion may be exchanged with an ion of greater nucleophilic character.

I claim:

1. The compound which is 2-(2,6-dibromo-4-trifluoromethylbenzyl)-2-pseudothiuronium bromide.

2. The compound which is 2-(2,6-dichloro-4-trifluoromethyl-benzyl)-2-pseudothiuronium chloride.

* * * * *